(12) United States Patent
Ghabra et al.

(10) Patent No.: US 6,812,900 B2
(45) Date of Patent: Nov. 2, 2004

(54) VEHICLE SEATING SYSTEM CAPABLE OF RECEIVING AND TRANSMITTING RADIO FREQUENCY SIGNALS

(75) Inventors: Riad Ghabra, Dearborn Heights, MI (US); Ronald O. King, Brownstown, MI (US); John S. Nantz, Brighton, MI (US); Qingfeng Tang, Novi, MI (US); Salman Khreizat, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 287 days.

(21) Appl. No.: 10/039,365

(22) Filed: Nov. 7, 2001

(65) Prior Publication Data

US 2003/0085799 A1 May 8, 2003

(51) Int. Cl.$^7$ ................................................ H01Q 1/32
(52) U.S. Cl. ........................................ 343/713; 343/711
(58) Field of Search ........................ 343/700 MS, 711, 343/712, 713; 340/445, 572

(56) References Cited

U.S. PATENT DOCUMENTS

| | | |
|---|---|---|
| 3,740,567 A | 6/1973 | Atkins |
| 4,115,757 A | 9/1978 | Blahunka |
| 4,464,664 A | 8/1984 | Edwards |
| 4,638,294 A | 1/1987 | Sakurai |
| 4,672,375 A | 6/1987 | Mochida et al. |
| 4,707,701 A | 11/1987 | Ohe et al. |
| 4,804,907 A | 2/1989 | Pecukonis |
| 4,845,505 A | 7/1989 | Ohe et al. |
| 4,873,530 A | 10/1989 | Takeuchi et al. |
| 4,973,958 A | 11/1990 | Hirano et al. |
| 5,159,714 A | 10/1992 | Cosentino et al. |
| 5,532,709 A | 7/1996 | Talty |
| 5,634,209 A | 5/1997 | Prudhomme et al. |
| 5,649,316 A | 7/1997 | Prudhomme et al. |
| 5,682,168 A | 10/1997 | James et al. |
| 5,751,073 A | 5/1998 | Ross |
| 5,812,095 A | 9/1998 | Adrian et al. |
| 6,072,436 A | 6/2000 | Marougi |
| 6,078,293 A | 6/2000 | Yamamoto |
| 6,208,305 B1 | 3/2001 | King |
| 6,356,194 B1 * | 3/2002 | Fukui et al. ................. 340/561 |
| 6,362,731 B1 * | 3/2002 | Lill ............................. 340/445 |
| 6,490,515 B1 * | 12/2002 | Okamura et al. ............ 701/49 |
| 6,508,512 B2 * | 1/2003 | Saberan et al. ............. 297/408 |

FOREIGN PATENT DOCUMENTS

FR 2768100 A1 * 3/1999 ........... B60R/11/02

OTHER PUBLICATIONS

English bibliographic information on FR2768100, "Cordless loudspeaker unit mounted in had rest of vehicle seat," at http://v3,espacenet.com printed Jun. 18, 2004.

* cited by examiner

Primary Examiner—Shih-Chao Chen
(74) Attorney, Agent, or Firm—Bill C. Panagos

(57) ABSTRACT

A vehicle seating system responsive to radio frequency (RF) signals is positioned within a vehicle passenger compartment. The system includes a module disposed within a headrest of the seat for receiving RF signals. The seat is separated from an interior boundary that defines the vehicle passenger compartment.

20 Claims, 3 Drawing Sheets

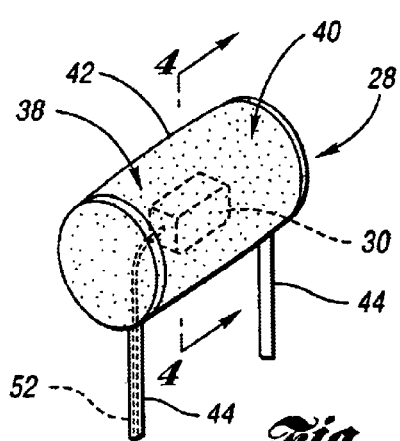
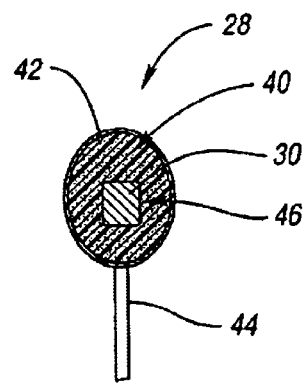
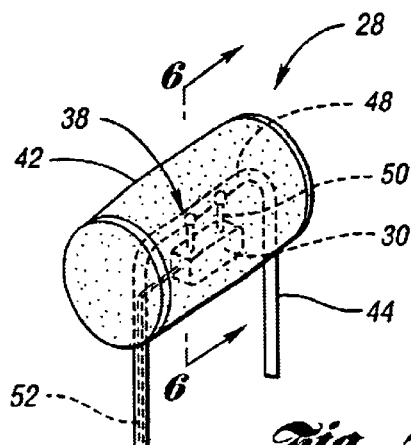
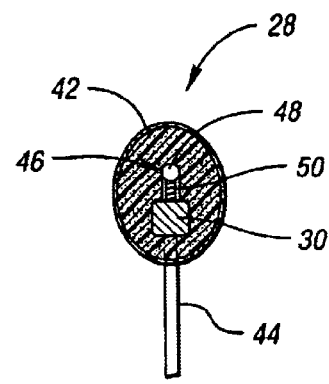
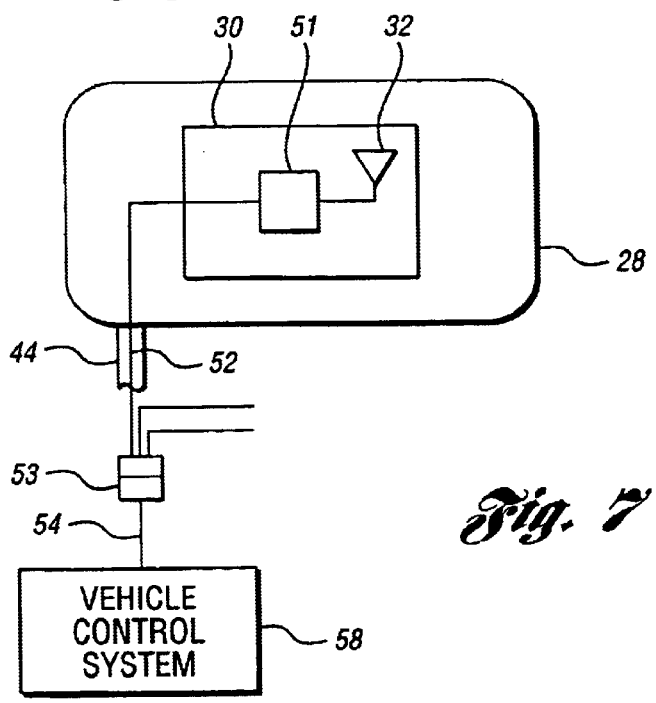

VEHICLE SEATING SYSTEM CAPABLE OF RECEIVING AND TRANSMITTING RADIO FREQUENCY SIGNALS

BACKGROUND OF THE INVENTION

1. Field of the Invention

This invention relates to radio frequency (RF) transmitting and receiving modules located within a vehicle passenger compartment.

2. Background Art

Typically, vehicle RF transmitting and receiving modules include an antenna. This antenna has been placed in any number of positions within a vehicle passenger compartment. Such positions include the roofing structure, rear view mirror, dashboard, glove box, steering wheel, roof support members, sun-visor, and the like.

The problem with many antenna placements is that they typically are either in close proximity to substantial metallic objects, have a substantial metallic object in a communication path between the antenna and an object with which it communicates, or are limited in functionality. Antennas in close proximity to substantial metallic objects or antennas having a substantial metallic-object within the signal communication path are susceptible to interferences. Some antennas, such as near-transparent film antennas, are limited in functionality as compared to wire-type antennas. Film antennas are typically limited in material selection, antenna placement, antenna aiming, and antenna size.

Therefore, there exists a need to uniquely position an antenna having full functionality within a vehicle passenger compartment so that the antenna is positioned away from nearby metallic objects while also having a substantially clear communication path between the antenna and the object with which it communicates.

SUMMARY OF THE INVENTION

In response, a uniquely positionable module for placement of virtually any type of antenna within the vehicle passenger compartment is provided.

In an embodiment of the present invention, a system responsive to RF signals includes a vehicle passenger compartment with at least one seat having a seat back not forming part of the interior boundary of the passenger compartment. The seat includes a headrest portion and a module centrally disposed within the headrest that is operative for communicating RF signals.

In an embodiment of the present invention, RF signals originating from a source outside of a the passenger compartment are receivable by the module.

In an embodiment of the present invention, RF signals are transmittable from the headrest module to a destination outside the passenger compartment.

In an embodiment of the present invention, RF signals originate from a control source such as, for example, a remote keyless entry device (RKE).

In an embodiment of the present invention, RF signals originate from an information sources, such as tire monitoring devices, radio stations, cellular telephones, trunk CD players, GPS transmitters, television stations, and the like.

In an embodiment of the present invention, a vehicle is controllable in response to RF signals receivable by a vehicle seating system.

In an embodiment of the present invention, a module is concealable within a headrest and has no portion of the module contacting an exterior surface of the headrest.

In an embodiment of the present invention, a module is positionable and supportable within a headrest by foam so that no portion of the module contacts an exterior surface of the headrest.

In an embodiment of the present invention, a module is positionable and supportable within a headrest by a headrest support member so that no portion of the module contacts an exterior surface of the headrest.

In an embodiment of the present invention, RF signal reception is improved by positioning the antenna in a front driver seat headrest where it is thereby sufficiently away from any metallic object and above a definable plane of substantial metallic objects.

BRIEF DESCRIPTION OF THE DRAWINGS

FIG. 3 is a perspective view of a headrest having a module disposed within an interior compartment of the headrest and supportable by foam according to an embodiment of the present invention;

FIG. 4 is a cross-section view of the FIG. 3 headrest according to an embodiment of the present invention;

FIG. 5 is a perspective view of a headrest having a module disposed within an interior compartment of the headrest and supportable by a support cross member according to an embodiment of the present invention;

FIG. 6 is a cross-section view of the FIG. 5 headrest according to an embodiment of the present invention;

FIG. 7 is a block diagram illustrating wired communication between a headrest module and a vehicle control system according to an embodiment of the present invention;

DETAILED DESCRIPTION OF THE PREFERRED EMBODIMENTS

Figure 1:
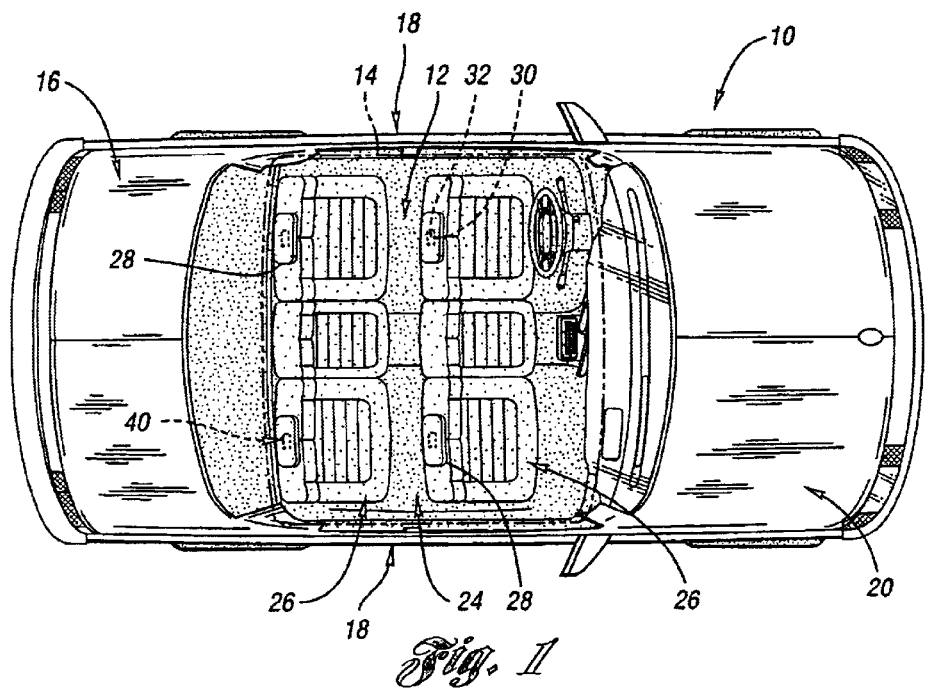
FIG. 1 is a top view of a vehicle having a vehicle passenger compartment with a seating system responsive to RF signals according to an embodiment of the present invention.
Figure 2:
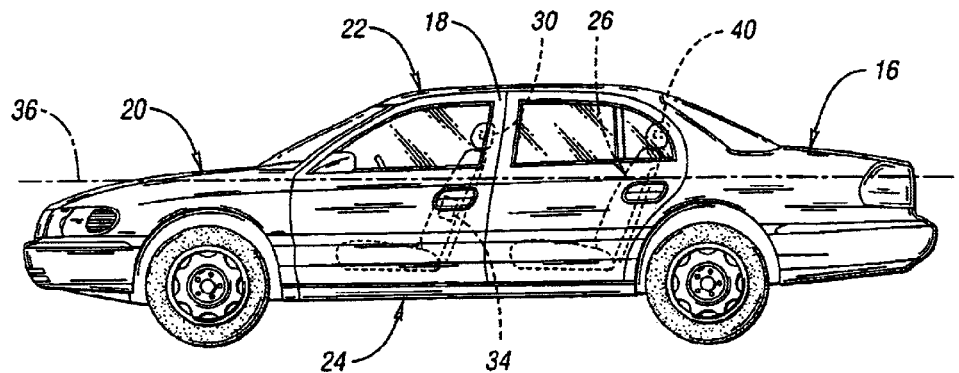
FIG. 2 is a side view of the FIG. 1 system according to an embodiment of the present invention.

FIGS. 1 and 2 illustrate vehicle 10 having a system responsive to RF signals. Vehicle 10 includes vehicle passenger compartment 12. Interior boundary 14 of passenger compartment 12 is perimeterly definable by rear end 16, set of door panels 18, front end 20, roof 22, and floor board 24. Passenger seats 26 are located within passenger compartment 12 as either rear passenger seats 26 or front passenger seats 26. In some vehicles 10, back rests for rear passenger seats 26 form part of interior boundary 14. In most vehicles, front passenger seats 26 do not form part of interior boundary 14.

Passenger seats 26 typically include headrest 28. In an embodiment of the present invention, at least one headrest 28 includes module 30. Module 30 is operative to form a radio link including at least one of receiving and transmitting RF signals. Module 30 typically comprises conducting wire antenna 32 capable of transmitting RF signals to and receiving RF signals from devices positioned either within or remote from passenger compartment 12.

Module 30 may be located substantially in the center of one or more headrest 28. The headrest 28 chosen is based, in part, on the configuration of vehicle passenger compartment 12 For example, in a typical sedan placement of module 30 in front headrest 28 locates module 30 in approximately the center of passenger compartment 12. Alternative placement in rear headrest 28 is less preferable because module 30 would be in close proximity to the substantially metallic rear end 16 RF signals passing in close proximity to substantial metallic objects, such as rear end 16, often experience interference. In other configurations such as, for example, a passenger van, module 30 may be more appropriately located in headrest 28 of a second row seat. It will be recognized by one of skill in the art that selection of seat 26 for the location of module 30 is dependent on a variety of design factors including size and configuration of passenger compartment 12, location of seat 26 within passenger compartment 12, type of vehicle 10, and the like.

Placing module 30 in the center of headrest 28 is preferable over other seat locations, such as seat back support portion 34, which may interpose metallic plane 36 into the radio link. Metallic plane 36 may be definable by passenger doors 18 combining with rear end 16 and front end 20, each representing a roughly planar region of substantial metal objects. As such, RF signals passing below or through plane 36 must pass through substantial metallic objects which may interfere with the radio link. Driver headrest 28 is above plane 36 and not in close proximity to substantial metallic objects. Thus, placement of antenna 32 in driver headrest 28 sufficiently separates module 30 from any substantially metallic object and above metallic plane 36 for improved signal transmission and limited interference subjectability.

FIG. 3 illustrates an embodiment of the present invention having module 30 disposed within interior compartment 38 of headrest 28 with foam 40 supporting and positioning module 30 within headrest 28. Foam 40 separates module 30 from outer material 42 covering headrest 28, allowing head pressure upon headrest 28 without any portion of covering material 42 contacting module 30. Headrest 28 is supported by a pair of hollow support tubes 44. Typically, tubes 44 allow headrest 28 to be positioned relative to seat 26. Foam 40 also separates module 30 from hollow support tubes 44.

FIG. 4 is a cross-section view of the FIG. 3 headrest illustrating module 30 being located within center region 46 of headrest 28 by foam 40. Module 30 is thus separate from outer covering material 42.

FIG. 5 illustrates an embodiment of the present invention having module 30 disposed within interior compartment 38 of headrest 28 by support cross member 48, which typically extends between the two hollow support tubes 44. Module 30 is attached to support cross member 48 by a bracket 50 so that no portion of module 30 contacts outer covering material 42.

FIG. 6 is a cross-section view of the FIG. 5 headrest illustrating module 30 located within center region 46 of headrest 28 by support cross member 48. Module 30 is thus separated from outer covering material 42.

Referring now to FIG. 7, a block diagram illustrating wired communication between a headrest module and a vehicle control system according to an embodiment of the present invention is shown. Module 30 in headrest 28 includes electronics 51 for one or more of modulating and demodulating RF signals. Preferably, electronics 51 convert received RF signals into digital signals for transmission down cable 52. The construction of electronics 51 is well known in the art. Cable 52 passes through headrest support tube 44. In the embodiment shown, cable 52 terminates at connector 53 which may provide, for example, power for a power seat supporting headrest 28. Wiring harness 54, terminating at the other side of connector 53, carries signals from cable 52 to vehicle control system 58. Power for module 30 may also be carried by harness 54 and cable 52 to module 30.

Figure 8:
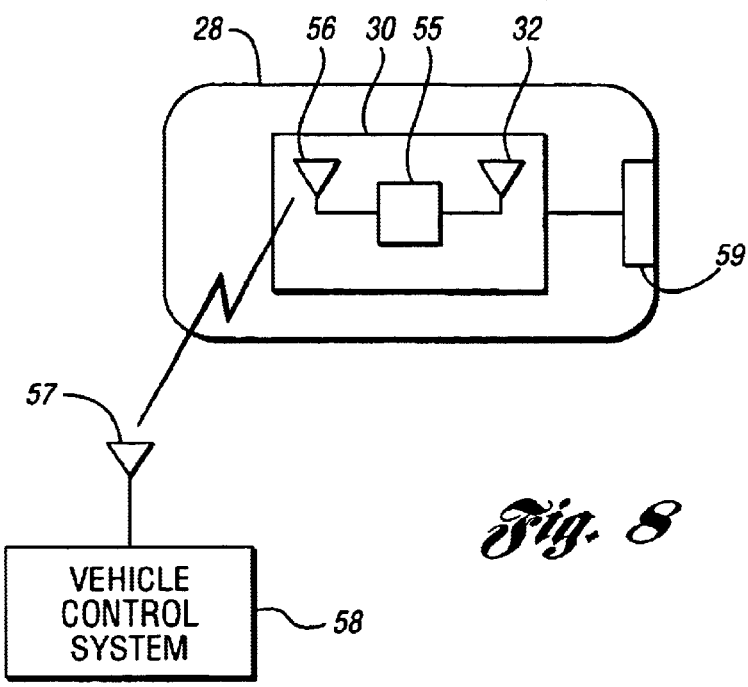
FIG. 8 is a block diagram illustrating wireless communication between a headrest module and a vehicle control system according to an embodiment of the present invention.

Referring now to FIG. 8, a block diagram illustrating wireless communication between a headrest module and a vehicle control system according to an embodiment of the present invention is shown. Module 30 in headrest 28 includes electronics 55 for remodulating signals between antenna 32 and antenna 56. Antenna 56 is in wireless communication with antenna 57 of vehicle control system 58. Module 30 may be powered by solar panel 59 attached to the side of headrest 28, eliminating the need for any wires running into headrest 28.

Figure 9:
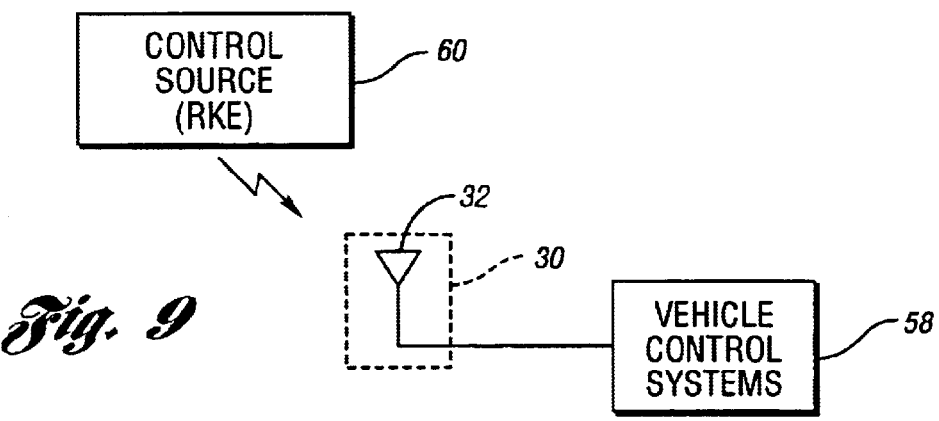
FIG. 9 is a block diagram of a headrest having a module with an antenna responsive to a control source, such as a remote keyless entry device, that can communicate a signal with a vehicle control system according to an embodiment of the present invention.

FIG. 9 illustrates an embodiment of the present invention in which module 30 communicates with control source 60 such as, for example, a remote keyless entry (RKE) device. Control source 60 may transmit and receive RF signals both within and outside of passenger compartment 12 RKE device 60 communicates by way of antenna 32 to vehicle control system 58, as described above. Control system 58 then controls other vehicular devices. For example, vehicle control system 58 my perform a number of actions such as arming/disarming a security system, unlocking/locking doors, opening a trunk, turning on lights, communicating with an information responsive device, or the like. Alternatively or additionally, vehicle control system 58 may transmit RF signals from headrest 28 to control source 60. For example, an RKE key fob may include an LED indicating vehicle status, such as the state of a vehicle alarm system, door locks or windows.

Figure 10:
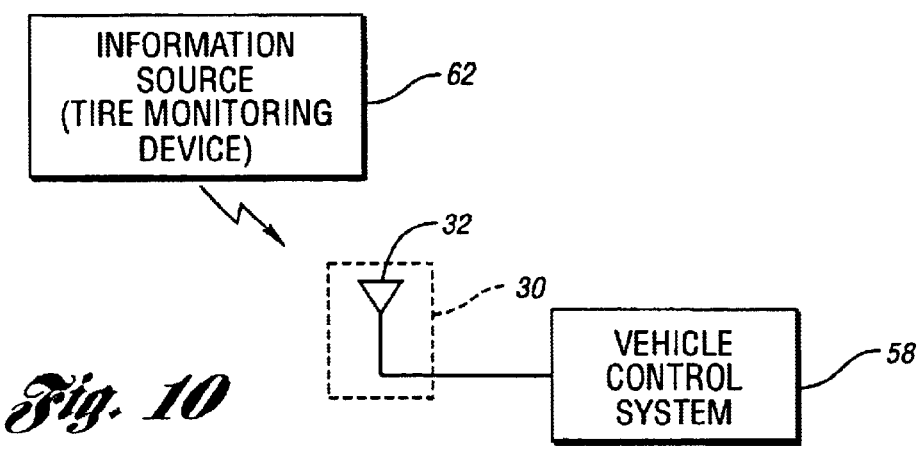
FIG. 10 is a block diagram of a headrest having a module with an antenna responsive to an information source, such as a tire monitoring device, that can communicate a signal with a vehicle control system according to an embodiment of the present invention.

FIG. 10 illustrates an embodiment of the present invention in which module 30 receives RF signals from information source 62 such as, for example, tire monitoring device 62. Information source 62 communicates information, such as tire pressure, to antenna 32 in module 30. Module 30 then communicates this information to vehicle control system 58. Control system 58 may then use an information responsive device, like a low pressure indicator light, a GPS indicator, a car radio, a television screen, or a cellular phone to communicate that information to a passenger.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicular seating system responsive to radio frequency (RF) signals, the system comprising:

a vehicle passenger compartment defined by an interior boundary;

a seat disposed within the passenger compartment, the seat having a seat back separated from the interior boundary;

a head rest extending from the seat back; and a module centrally disposed within the headrest for receiving RF signals.

2. The system of claim 1, wherein the RF signals originate from a source outside of the passenger compartment.

3. The system of claim 1, wherein the module is further operative to transmit RF signals to a destination outside the passenger compartment.

4. The system of claim 1, wherein the RF signals originate from a control source.

5. The system of claim 4, wherein the control source is a remote keyless entry device (RKE).

6. The system of claim 1, wherein the RF signals originate from an information source.

7. The system of claim 6, wherein the information source is a tire monitoring device.

8. The system of claim 1, further comprising means for a vehicle control system to communicate with the module in response to the received signals.

9. The system of claim 1, wherein the module is supported and positioned within the headrest by foam, the module separated from an outer covering material of the headrest.

10. The system of claim 1, wherein the module is supported within the headrest by a cross member within the headrest, the module separated from an outer covering material of the headrest.

11. The system of claim 1, wherein the seat is a front seat.

12. The system of claim 1, wherein the headrest is located above a definable metallic plane comprising vehicle door panels.

13. The system of claim 1, wherein the headrest is substantially clear of interference from any substantial metallic object within the passenger compartment.

14. The system of claim 1, wherein the module comprises an antenna.

15. A vehicle seating system for receiving RF signals, the seating system comprising:

a seat back portion;

a headrest portion extendable from the seat back portion, the headrest portion having an interior compartment; and an antenna centrally disposed within the interior compartment for receiving RF signals.

16. The system of claim 15, wherein the seat back portion is for a vehicle seat not forming any portion of an interior boundary of a vehicle passenger compartment.

17. The system of claim 15, wherein the antenna is operative to transmit RF signals.

18. The system of claim 15, wherein the antenna is separated from an outer surface of the headrest.

19. A remote keyless entry (RKE) system for an automotive vehicle comprising:

an RKE device for transmitting radio frequency (RF) signals;

a front vehicle seat having a headrest;

an antenna centrally disposed within the headrest, the antenna capable of receiving RE signals from the RKE device; and a control system in communication with the antenna, the control system responsive to the RKE signals.

20. The RKE system of claim 19, wherein the antenna is separated from an outer surface of the headrest.

* * * * *

UNITED STATES PATENT AND TRADEMARK OFFICE
CERTIFICATE OF CORRECTION

PATENT NO. : 6,812,900 B2 Page 1 of 1
DATED : November 2, 2004
INVENTOR(S) : Riad Ghabra et al.

It is certified that error appears in the above-identified patent and that said Letters Patent is hereby corrected as shown below:

<u>Column 6,</u>
Line 26, delete "RE" and insert -- RF --.

Signed and Sealed this

Fifth Day of April, 2005

JON W. DUDAS
*Director of the United States Patent and Trademark Office*